United States Patent [19]

Shinn et al.

[11] Patent Number: 5,806,050
[45] Date of Patent: Sep. 8, 1998

[54] ELECTRONIC TRANSACTION TERMINAL FOR VOCALIZATION OF TRANSACTIONAL DATA

[75] Inventors: Phil Shinn, Santa Monica, Calif.; Richard Hartheimer, Morris Plains, N.J.; Edward Howorka, Greenbrook, N.J.; Chris Klepka, Parsippany, N.J.

[73] Assignee: EBS Dealing Resources, Inc., New York, N.Y.

[21] Appl. No.: 226,511

[22] Filed: Nov. 12, 1993

Related U.S. Application Data

[63] Continuation-in-part of Ser. No. 76,317, Jun. 11, 1993, abandoned, which is a continuation-in-part of Ser. No. 830,408, Feb. 3, 1992, Pat. No. 5,375,055.

[51] Int. Cl.$^6$ .................................................. G06F 17/60
[52] U.S. Cl. ................................................................ 705/37
[58] Field of Search .................................... 395/2.7, 2.67, 395/2.69, 2.77, 2.74, 2.75, 2.79; 364/408; 381/51, 52

[56] References Cited

U.S. PATENT DOCUMENTS

| | | | |
|---|---|---|---|
| 3,704,345 | 11/1972 | Coker et al. | 395/2.75 |
| 4,677,552 | 6/1987 | Sibley, Jr. | 364/408 |
| 4,942,616 | 7/1990 | Linstroth et al. | 381/51 |
| 5,212,731 | 5/1993 | Zimmerman | 381/52 |
| 5,305,200 | 4/1994 | Hartheimer et al. | 364/408 |

*Primary Examiner*—Donald McElheny, Jr.
*Attorney, Agent, or Firm*—Fulbright & Jaworski L.L.P.

[57] ABSTRACT

A method for vocalizing information from an electronic brokerage system (EBS) used in international currency exchange incorporates a specialized grammar to emulate the interpersonal trading style and vernacular used by foreign currency brokers catering to the international banking industry. Used in conjunction with the screen display of an EBS, the vocalizing method makes the system easier for a trader to use by emphasizing information content. The vocalizing method optimizes redundancy of data available to the user to minimize both the ambiguity of data to and the cognitive effort of the user. The vocalizing method chooses what data should be vocalized, when the data should be vocalized, and, in what manner the data should be vocalized. For example, a long form of the offer and bid prices is initially vocalized which includes both figure and pips data, but thereafter only the pips are vocalized. Three categories of messages each provide different data to the system user. First, market broadcast messages provide quote and bid information. Second, maker and taker specific messages provide specific deal information between the parties to an ongoing or completed transaction. Third, system deals and price change reasons messages provide all workstations dealing in the currency pair with recent prices given and paid for that currency pair, at least when it affects the current best price. The trader may have none, all, one, or two of the three categories of messages vocalized by setting the workstation trader profile accordingly. Additionally, the trader may choose with which of a variety of voices the workstation will speak.

33 Claims, 7 Drawing Sheets

Fig. 3a

- Audio Channel
  - ☐ Private
  - ☐ Price
- Say Given/Paid for:
  - ⬤ EBS Deals
  - ○ Dealable Prices
  - ○ Never
- Work The Balance
  - ○ Always
  - ○ Partial
  - ⬤ Never

- Dealable Price Display
  - ○ Regular Priority
  - ⬤ Best Dealable

- ☐ Price Time Limit: [None] [Min:Sec]
- ☐ Input Panel Time-out [None] [Seconds]
- Keyboard Time-out [0] [Minutes]

- ☐ Treader Deals
- ☐ EBS Deals
- ☐ Display EBS Best
- ☐ Cancel When Bettered
- ☐ Bid/Offer Auto-Interrupt
- ☐ Price Panel Overlay

ELECTRONIC TRANSACTION TERMINAL FOR VOCALIZATION OF TRANSACTIONAL DATA

CROSS REFERENCE TO RELATED APPLICATIONS

This is a continuation in part of U.S. application Ser. No. 08/076,317 filed 11 Jun. 1993 (now abandoned), which in turn is a continuation-in-part of U.S. application Ser. No. 07/830,408 filed 3 Feb. 1992 (now U.S. Pat. No. 5,375,055).

TECHNICAL FIELD

The present invention relates generally to an electronic brokerage system having a communication network connecting traders dealing in financial instruments or other commodities, and more particularly to a computerized system for vocalizing price information in a way that optimizes redundancy of data available to the trader and minimizes the trader's cognitive effort.

BACKGROUND ART

Various electronic trading systems exist. In the field of foreign currency trading, Reuters' European patent applications EP 399 850, EP 407 026, and EP 411 748 disclose a networked automated matching system for anonymous trading. The Reuters system does not include a method for vocalizing data broadcast to users' terminals.

The above referenced U.S. Pat. No. 5,375,055 (which is herein incorporated by reference in its entirety), now U.S. Pat. No. 5,375,055 discloses an electronic brokerage system displaying different prices to different traders based on credit considerations. A vocalizing capability is mentioned, however the application does not specifically disclose the grammar, timing, and priorities associated with the various vocalized messages.

U.S. Pat. No. 4,868,866 issued to B. L. Williams discloses a broadcast data distribution system. The Williams system is not a trading system and does not involve a method for vocalizing distributed data; however it could be used to distribute data which is used in the trading industry. A feature of the system is data repetition. According to rules within the system, certain data messages are repeated to ensure accurate reception by all subscribers. Also, in high data traffic situations the system adapts by only sending recap messages. Another feature of the Williams system is that individual subscribers only receive certain designated data. The system issues broadcast entitlement messages which enable or disable the subscribers' receiving apparatus.

Accordingly, there is a need for a vocalizing method which makes an electronic trading system easier to use by emphasizing information content in a way that optimizes redundancy of data available to the user and minimizes the user's cognitive effort. By implementing the vocalizations in a context sensitive manner any ambiguities in the data are minimized.

SUMMARY OF THE INVENTION

Information from an electronic transaction system, for example foreign currency exchange, is vocalized at each trader's workstation. An application specific grammar is used in conjunction with a time and priority algorithm. The grammar provides rules for how various forms of prices are vocalized in a specific trading scenario, and the algorithm determines when and in which form the prices are vocalized.

In the specific context of a foreign exchange trading system, a price is the value of a local currency expressed in units of a base currency such as US dollars (USD). In international currency transactions the custom is to break down a currency price into three parts: figure, pips, and, optionally, extra pips.

In a preferred embodiment there are two classes of currency prices relating to an electronic broadcast for spot trades of foreign currencies. In the first class, the figure consists of the pre-decimal point part and the first pair of post-decimal point digits of the price (the tenths and hundredths positions), the pips consist of the second pair of post-decimal point digits (the thousandths and ten-thousandths positions), and the extra pips consist of the third pair of post decimal point digits (the hundred-thousandths and millionths positions). Most of the currency prices are class one. In the second class, the figure consists of the pre-decimal point part of the price, the pips consist of the first pair of post-decimal point digits (the tenths and hundredths positions), and the extra pips consist of the second pair of post-decimal point digits (the thousandths and ten-thousandths positions). Only a few currency prices are class two. Where the figure is represented by F, pips by P, and extra pips by E, the following are class one and class two currency prices, where "()" indicates an optional digit or digit pair:

class one=(F).FFPP(EE)

class two=(F)(F)F.PP(EE)

One specific aspect of the invention relates to a particular way of vocalizing the price. The price is vocalized as pairs of digits. For example, 1.2345 would be vocalized as "one twenty-three forty-five". There are numerous exceptions to this rule. First, when there is a zero in the more significant pips position an "oh" is vocalized. Second, when an extra pips pair is 25, 50, or 75, it is vocalized as "a quarter", "a half", and "three-quarters". Third, a leading zero before the decimal point is not vocalized. Fourth, when there is a 00 in the figure it is vocalized as "double oh", but when in the pips it is vocalized as "figure". Fifth, the extra pips are separated from the pips by vocalizing the word "and". For example, 1.234567 (class) 1 is vocalized in the long form as "one twenty-three forty-five and sixty-seven".

In accordance with another specific aspect of the invention, redundancy of vocalized data available to the user minimizes both the ambiguity of data to and the cognitive effort of the user. The preferred vocalizing method chooses what data should be vocalized, when the data should be vocalized, and in what manner the data should be vocalized. This is achieved by breaking the data into three categories of messages each of which provide different data to the system user. Each category has different identifying words used in conjunction with a price or amount so as to distinguish what information is being vocalized. Prices are vocalized in whatever form the grammar deems appropriate; sometimes a form including the figure and pips is used, but, more frequently, a short form comprised only of pips is used.

Market broadcast messages provide quote and bid information. These messages are typically the offer and bid prices followed by any special modifiers. The special modifiers inform the trader when the quote is small, when there is a bid with no offer, when there is an offer without a bid, and when the bid and offer are the same.

Maker and taker specific messages provide specific deal information between parties to an on-going or completed transaction. These messages announce the size of the deal and/or an action taken, such as the maker bidding or offering and the taker buying or selling. When an offer has been taken or a bid has been hit, different messages are vocalized to the maker and taker. Additionally, messages telling the taker when a hit or take has been completely or partially missed and telling the maker when a quote has been canceled are vocalized. There is also a message to reflect working the balance when a partial quote is still alive.

System deals and price change reasons messages provide workstations dealing in the currency pair with the recent prices given and paid for that currency pair. By setting the workstation Trader Profile accordingly the trader may choose to have all recent prices vocalized or to have recent prices vocalized only when the recent price given or paid is a reason for a price change.

In a currently preferred embodiment the workstation user may request none, all, one, or two of the three categories of messages vocalized by setting the workstation Trader Profile accordingly. Additionally, the trader may choose with which of four voices the workstation will speak.

BRIEF DESCRIPTION OF THE DRAWINGS

Other objects and features of the present invention will be apparent from the following description of a presently preferred embodiment taken in connection with the accompanying drawings in which:

FIGS. 3a and 3b depict a workstation's Trader Profile displays;

DETAILED DESCRIPTION OF THE PREFERRED EMBODIMENT

An Electronic Brokerage System (EBS) which runs on a computer network for use in foreign currency exchange is preferably implemented in a way that reflects actual broker to trader verbal communication. The present invention provides vocalization rules which involve what data and information should be vocalized, how it should be vocalized, and when it should be vocalized as it operates in conjunction with data portrayed on a trader's workstation.

Figure 1:
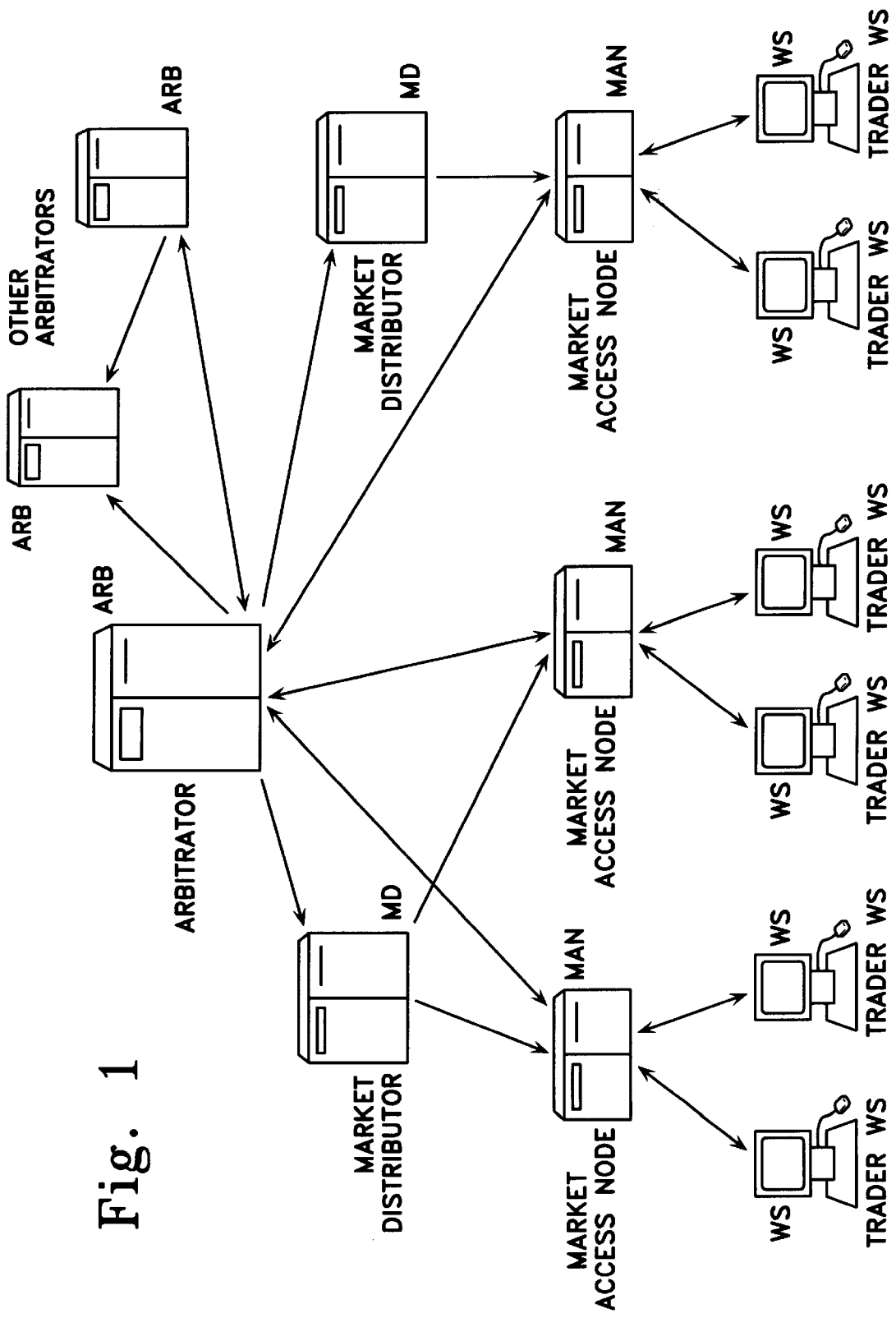
FIG. 1 depicts the Electronic Brokerage System network.
Figure 2A:
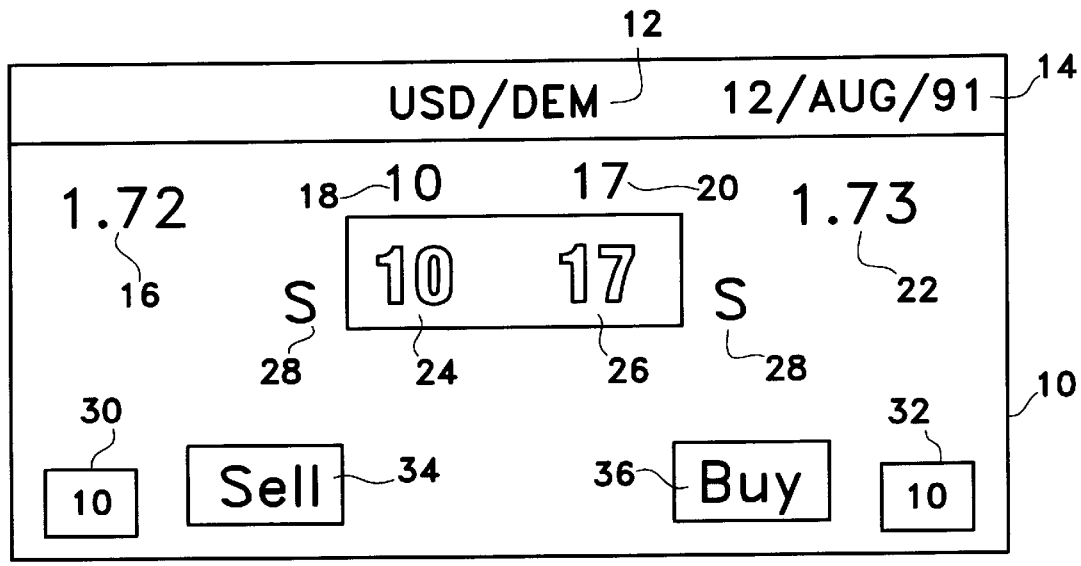
FIGS. 2a and 2b depict the Electronic Brokerage System screen displays.
Figure 2B:
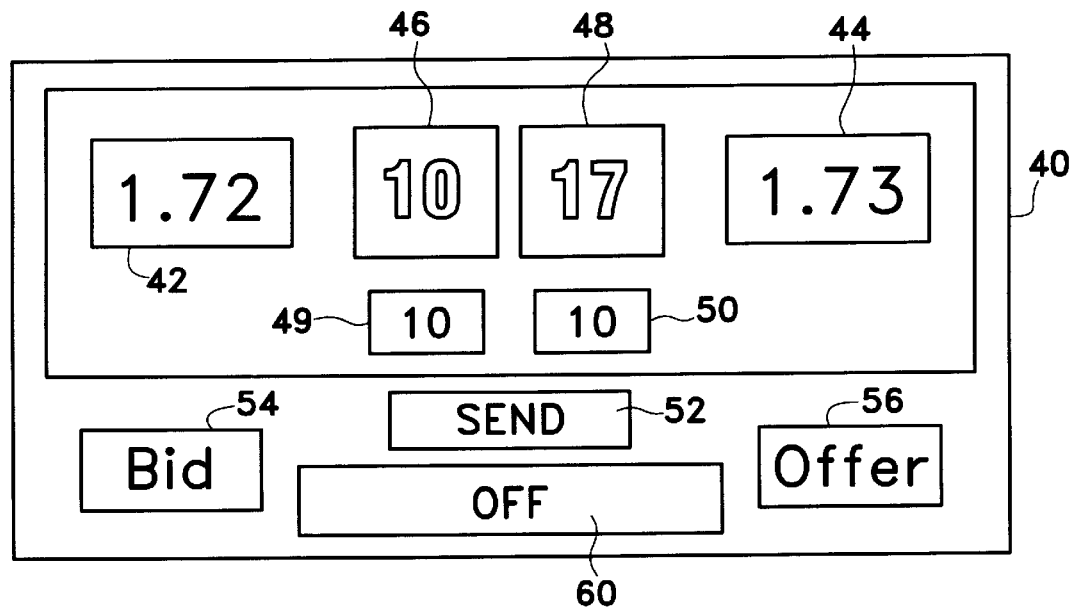

A currently preferred embodiment runs on workstations connected in an EBS network as shown in FIG. 1, and is described in more detail in the above referenced co-pending application. When events occur in a trading transaction, appropriate data are displayed in defined places on a workstation screen as shown in FIGS. 2a–2b, and specified colors are used to highlight certain information. The vocalization method of the present invention serves to highlight information in conjunction with and in addition to the textual data and color displayed on the screen. Additionally, the vocalization method uses inflection with its specialized way of speaking currency prices and trading information. The trader chooses what data is vocalized by setting the workstation Trader Profile which is shown in FIG. 3A.

The workstations in a presently preferred embodiment are part of the IBM PS/2 family. The vocalization may be achieved by standard digitized speech technology familiar to those skilled in the art. The vocalized phrases (or components thereof) may be stored in a format familiar to those skilled in the art on memory chips (PROMs) or read from disk and placed in RAM (upon system boot up), and preferably originate from actual recordings of spoken words or phrases. In that regard, in order to provide a natural sounding voice using finite RAM memory, it has been found preferable to isolate and store individual words or digits from a spoken multidigit number or phrase; each of the digits is preferably separately stored with both rising (for bids) and falling (for offers) inflections.

A price is the value of a currency pair. The value of a currency pair is the number of units of one currency which would purchase one unit of another currency. In international currency transactions the custom is to break down a currency pair price into three parts: the figure, the pips, and, optionally, the extra pips. In a preferred embodiment there are two classes of currency pair prices relating to an electronic broadcast for spot trades of foreign currencies.

In the first class of currency pair prices, the figure consists of the pre-decimal point part and the first pair of post-decimal point digits of the price (the tenths and hundredths positions), the pips consist of the second pair of post-decimal point digits (the thousandths and ten-thousandths positions), and the optional extra pips consist of the third pair of post decimal point digits (the hundred-thousandths and millionths positions). In a presently preferred embodiment there are thirteen class one currency pairs as shown in Table 1.

In the second class of currency pair prices, the figure consists of the pre-decimal point part of the price, the pips consist of the first pair of post-decimal point digits (the tenths and hundredths positions), and the optional extra pips consist of the second pair of post-decimal point digits (the thousandths and ten-thousandths positions). In a presently preferred embodiment three currency pairs are class two as shown in Table 1.

Where the figure is represented by F, pips by P, and extra pips by E, the following are class one and class two currency pair prices where "()" indicates an optional digit or digit pair:

class one=(F).FFPP(EE)

class two=(F)(F)F.PP(EE)

One specific aspect of the invention relates to a particular way of vocalizing the price. The price is typically vocalized as "pairs of digits". For example, 1.2345 would be vocalized as "one twenty-three forty-five". Further examples of price vocalizations are shown in Tables 2 and 3.

There are numerous modifications and enhancements to the basic "pairs of digits" price vocalization rule. First, when there is a zero in the more significant pips position an "oh" is vocalized. Second, when the extra pips pair is 25, 50, or 75 it is vocalized as a quarter, a half, and three-quarters. Third, a leading zero before the decimal point is not vocalized. Fourth, when there is a 00 in the figure it is vocalized as "double oh", but when in the pips it is vocalized as "figure". Fifth, the extra pips are separated from the pips by vocalizing the word "and". For example, 1.234567 class one is vocalized in the long form as "one twenty-three forty-five and sixty-seven". Sixth, when there is only a zero to the left of the decimal point it is not vocalized in any way. For example, 0.1234 is vocalized as "twelve thirty-four". Seventh, class two prices with pips as double zero (00) and a figure of 100, 200, etc. (that is, 100.00, 200.00, etc.) are vocalized as "one hundred", etc. Examples of price vocalizations are shown in Tables 2 and 3.

Prices are vocalized in whatever form the grammar deems appropriate: sometimes a "long form" including the figure and pips is used, but, more frequently, a "short form" containing only pips is used. The workstation may also vocalize a "medium form" and an "around form". Table 4 shows a sequence of quotes, the corresponding price vocalizations, and brief reasons for the use of the particular form of the vocalization.

Figure 4:
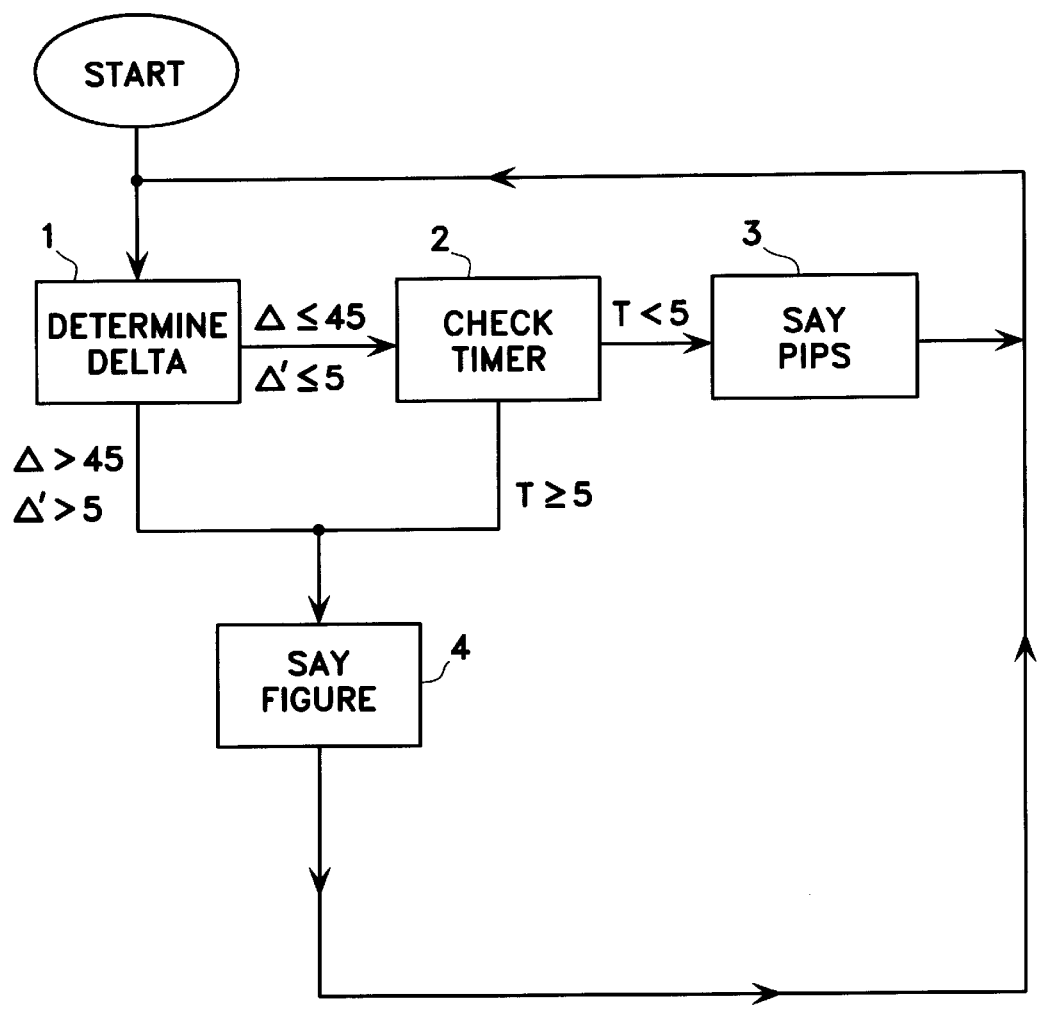
FIG. 4 is a functional flow chart showing when the price should be vocalized and in what general form.

The workstation typically only vocalizes the pips or short form of the bid and offer. However, the workstation vocalization rules require the figure to be vocalized in two specified situations. First, the figure is vocalized when it has not been said in five minutes. Second, the figure is vocalized when a predetermined allowed spread between the maximum and minimum of the current and previous bid and offer prices is exceeded. This rule is shown in FIG. 4.

Figure 5:
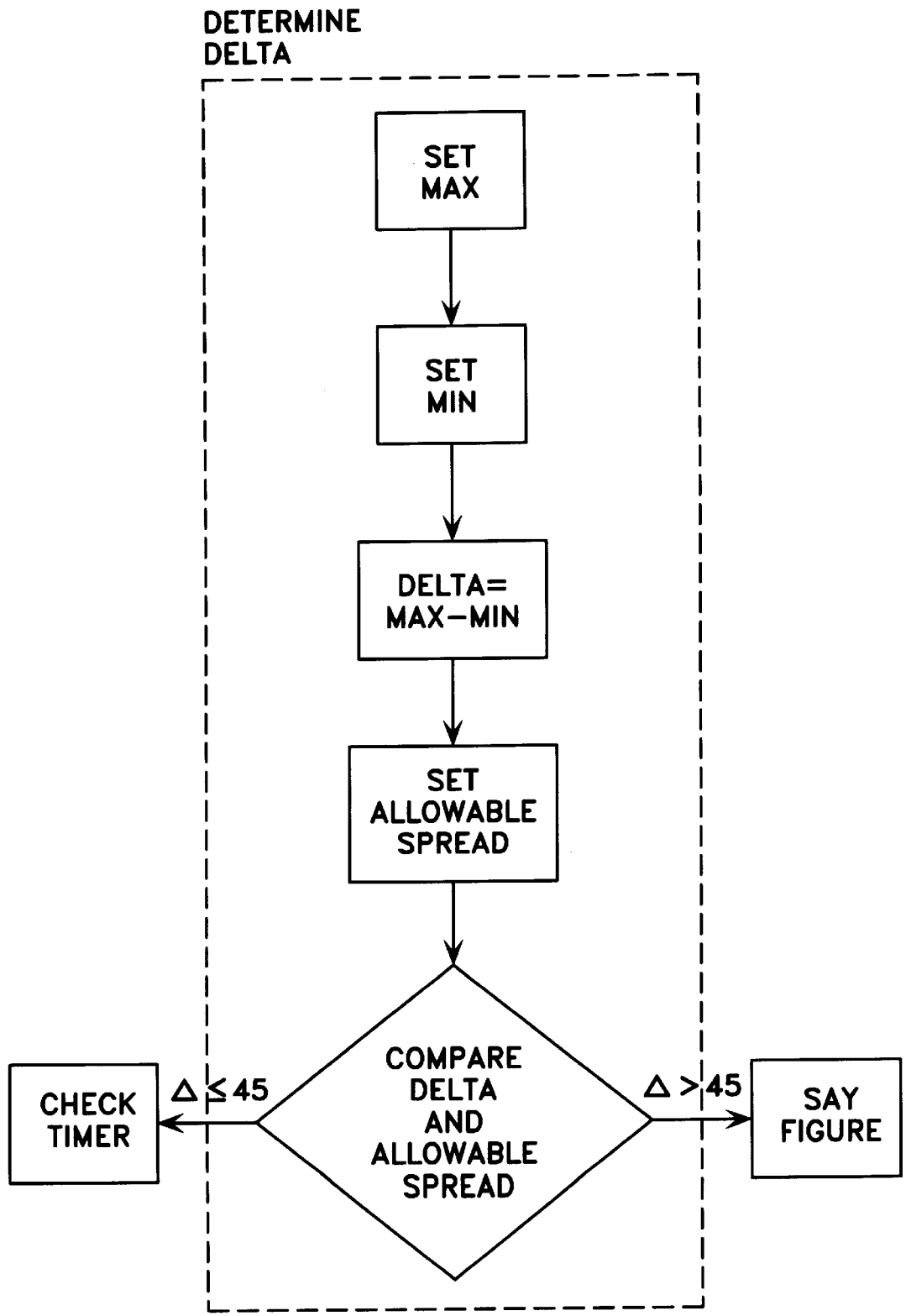
FIG. 5 is a functional flow chart showing how delta is determined.

More specifically, in a currently preferred embodiment when the current bid price is greater than the current offer price (arbitrage opportunity), the allowed spread is five; otherwise, the allowed spread is forty. A variable labelled delta is used in determining whether the allowed spread has been exceeded. Delta is set to be the difference between the minimum and maximum of the four values of the current bid, current offer, most recent bid, and most recent offer. If there is neither a most recent bid or most recent offer, those values are ignored. The figure is vocalized whenever delta is greater than the allowed spread. For example, if the most recent bid and offer prices are 1.2323 and 1.2345 and the current bid and offer prices are 1.2340 and 1.2378, the delta is 55; and since the delta is greater than the allowed spread, 40, the figure must be vocalized. A flow chart of a possible implementation of this rule is shown in FIG. 5.

Figure 6:
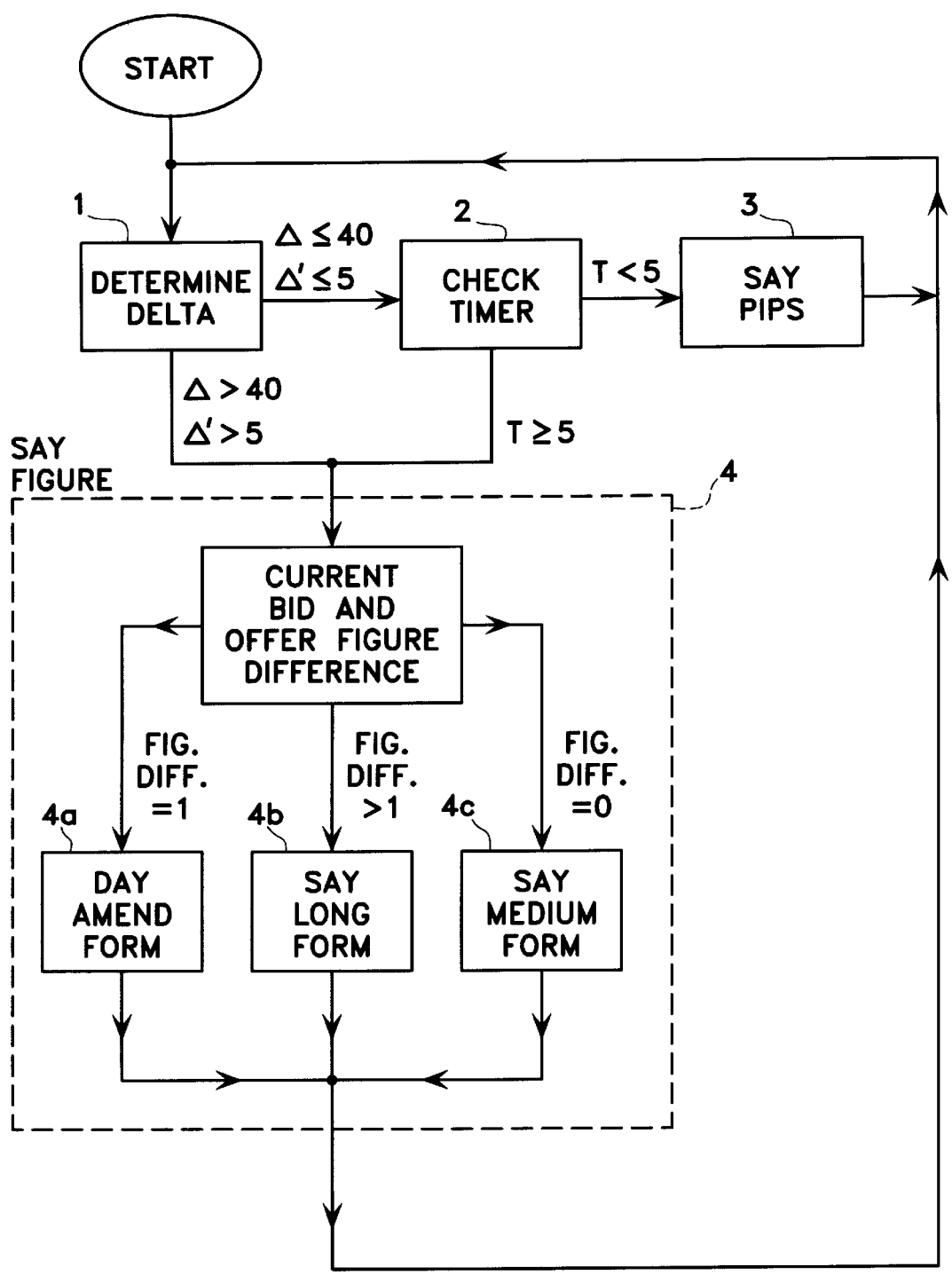
FIG. 6 is a functional flow chart showing when the price should be vocalized and in what specific form.

There are three ways of vocalizing the figure: the "long form", the "medium form" and the "around form". An algorithm for determining what form should be vocalized is shown in FIG. 6.

The workstation vocalizes the "long form" of the bid and offer when the bid price is more than the offer price or when the bid and offer figures differ by more than one. Also, the "long form" is vocalized when there is a single sided price and when the workstation is powered on or booted up. A price is considered single sided when there is either a bid or an offer, but not both. The "long form" includes the price's figure and pips. For example, if the class one bid is 1.7412 and the offer is 1.7734, the figure must be vocalized because the delta, 322, is greater than the allowed spread, 40; the "long form" of the prices is vocalized because the offer figure is three more than the bid figure (and three is greater than one); thus, the workstation vocalizes "one seventy-four twelve one seventy-seven thirty-four".

When the figures are the same and the figure must be vocalized, the workstation vocalizes the "medium form" of the currency pair price. An example of when a "medium form" vocalization is used is when the figure has not been said in five minutes, the bid is 1.2345, and the offer is 1.2389. In this instance the workstation vocalizes "one twenty-three forty-five eighty-nine".

When the bid and offer prices are relatively close but the figures are different, and it is necessary to vocalize the figures, they are vocalized in an "around form". Bid and offer prices are considered around each other when the offer figure is exactly one more than the bid figure. For example, if the class one bid is 1.7696 and the offer is 1.7705 the workstation uses the "around form" if the figure must be vocalized. With the "around form" vocalization the pips of the bid and offer prices are vocalized followed by the word "around" followed by the last digit of the offer figure. For example, a class one bid of 1.7696 with an offer of 1.7705 is vocalized in the around form as "ninety-six oh-five around seven".

In accordance with another specific aspect of the invention, redundancy of vocalized data available to the user minimizes both the ambiguity of data to and the cognitive effort of the user. The preferred vocalizing method chooses what data should be vocalized, when the data should be vocalized, and in what manner the data should be vocalized. This is achieved by breaking the data into three categories of messages each of which provide different data to the workstation user. Each category has different identifying words used in conjunction with a price or amount so as to distinguish what information is being vocalized.

In a currently preferred embodiment the user of the vocalizing system may choose to have none, all, one, or two of three categories of messages vocalized at his/her workstation. The vocalizing method determines which categories of messages to vocalize by examining the Trader Profile settings as stored at the workstation and set by the trader and as shown in FIG. 3A. Additionally, in a currently preferred embodiment the trader may choose with which of four voices the workstation will speak. This feature diminishes confusion in a room with multiple EBS workstations.

The first category of messages a workstation may vocalize are market broadcast messages. These messages are vocalized if "price" information is selected in the workstation's Trader Profile. Market broadcast messages provide quote information to EBS users. These messages are typically the bid and offer prices followed by modifying words, if appropriate. The modifiers inform the trader when the quote is small, when there is only a bid with no offer, when there is an offer without a bid, when the bid and offer are the same, and when the bid and offer are close to each other. A complete list of market broadcast messages is shown in Table 5.

Figure 3B:
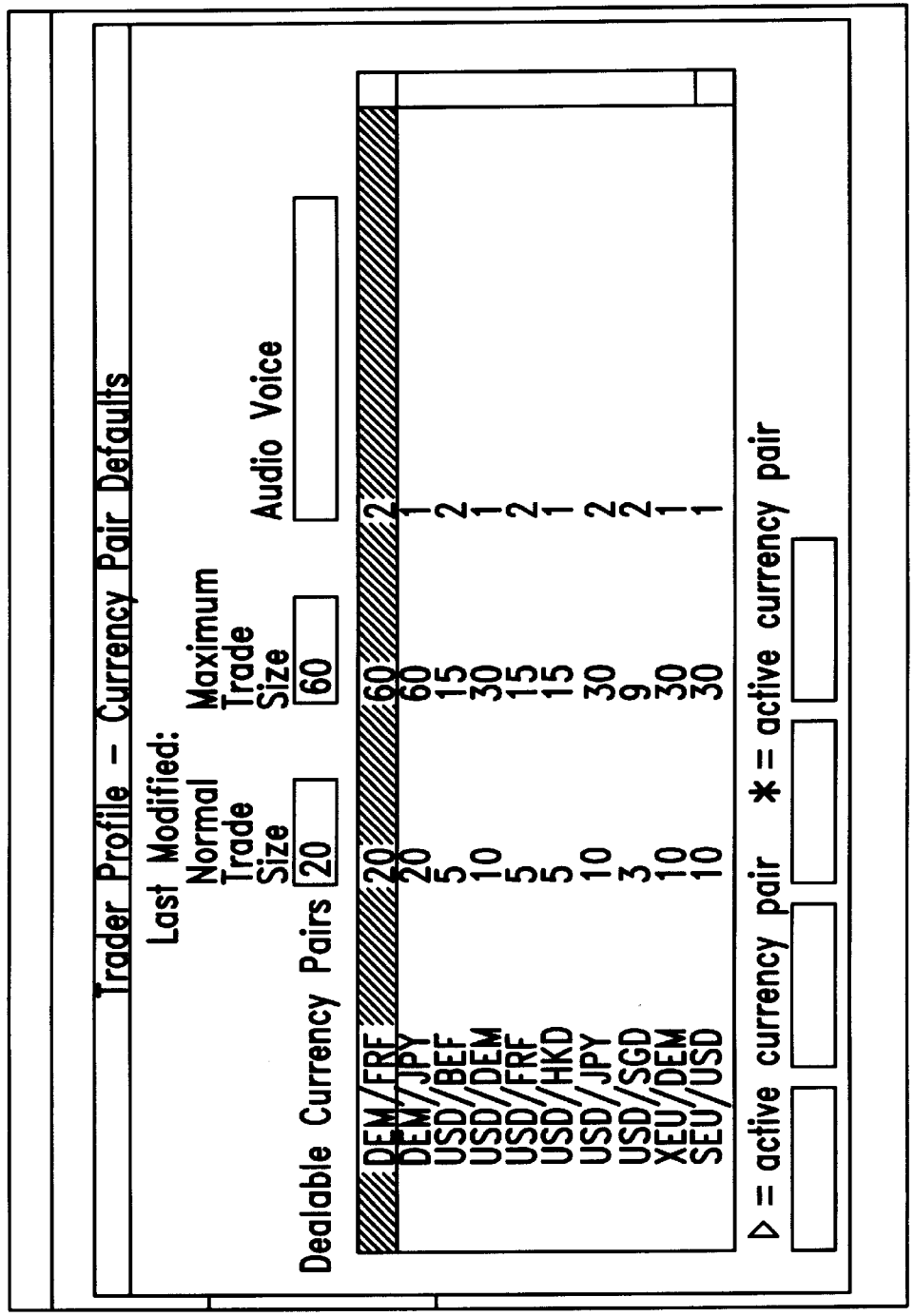

After thirty seconds of market price inactivity (assuming the market price vocalization option has been selected), the workstation asks the user to enter a currency pair price value by vocalizing the phrase "<currency pair> please". For example, the workstation could vocalize the phrase "dollar mark please". A currency pair price value is a numeric entry in the base currency for an already specified currency pair. The sixteen currency pairs available in a currently preferred embodiment are shown in Table 1. A trader sets a default currency pair by accessing the Trader Profile Currency Pair Defaults screen as shown in FIG. 3B. If the currently active currency pair is not listed in the Trader Profile, the workstation vocalizes the phrase "quote please" in place of "<currency pair> please". When prices change they are immediately broadcast over the EBS network and vocalized by workstations with "price" selected in the Trader Profile (as shown in FIG. 3A). Usually only the pips are broadcast. When there is no change in the price, the current price is vocalized by the workstation after ten seconds.

The syntax for a broadcast message price quote is the bid price followed by the offer price. The bid price is vocalized with a rising inflection and the offer price is vocalized with a falling inflection. This serves to distinguish the bid and offer prices and makes the vocalization easier for the trader to comprehend. The prices are vocalized as already described above. In the typical situation only pips are vocalized. Extra pips are used optionally. If either a class two currency pair or if the extra pips of a class one currency pair are vocalized, a pause may be inserted between the bid and offer price vocalizations to improve clarity. If only a bid is available on the market the workstation vocalizes "<price> bid". And if only an offer is available on the market the workstation vocalizes "<price> offered".

One special situation is when the amount bid and/or offered is small. An amount is small when less than a predetermined number of units of the base currency is the object of the transaction. The number of units which qualify an amount as small is preferably currency pair dependent. For example, an amount is small when less than five million units are involved in a USD/DEM transaction while less than two million units qualify an amount as small when a GBP/USD transaction. To alert the trader to this situation particular phrases are added after the bid/offer vocalization. The phrase "small bid" is vocalized after a bid/offer pair when the bid amount is small. The phrase "small offer" is vocalized after a bid/offer pair when the offer amount is small. And the phrase "in small" is vocalized following a bid/offer pair when both the bid and offer are small. Also, when there is only a small offer available unaccompanied by a bid, the workstation vocalizes "<price> offered small". And when there is only a small bid available unaccompanied by an offer, the workstation vocalizes "<price> bid small".

Another special situation is when the bid and offer prices are the same. In this situation the price is only vocalized once followed by the word "choice". Also, the small and same rules may be combined when appropriate. When there is a small bid with a regular offer, and bid and offer prices are the same, the workstation vocalizes "<price> choice small offer". When there is a regular bid with a small offer, and the bid and offer prices are the same, the workstation vocalizes "<price> choice small bid".

Yet another special situation is when there is a single sided quote. A single sided quote is when there is a bid unaccompanied by an offer, or an offer unaccompanied by a bid. If there is a single sided quote the workstation vocalizes the bid or offer price followed by the words "bid" or "offer", and, if appropriate, the word "small". Note that the "long form" of the figure is vocalized when there is a single sided quote and the figure must be vocalized (either the price has changed beyond a predetermined threshold, or the figure has not been announced for a predetermined time interval).

The second category of messages a workstation may vocalize are maker and taker specific messages. These messages are only vocalized if "private" is selected in the workstation's Trader Profile. Maker and taker specific messages provide specific deal information between potential and actual parties to a transaction and are shown in Table 6. These messages announce the size of the deal and/or an action taken, such as the maker bidding or offering and the taker buying or selling. Neither the currency of the trade nor the other party's identity is vocalized.

In these messages the only number vocalized is the amount of the transaction, where the amount stands for the size of the transaction in units of base currency. The amount is a number from one to 999 representing millions. The amount is vocalized as a number would be spoken in common parlance (for example, 123 is vocalized as "one-hundred-twenty-three"). Note that the amount may be the complete amount desired or some smaller amount depending on how the trader set the "work the balance" Trader Profile option at his/her workstation. This is discussed in more detail below.

There is a group of messages that are only vocalized at a maker's workstation. When a maker enters a bid which becomes dealable on at least one floor, the workstation vocalizes the phrase "your bid" at the maker's workstation. And when a maker enters an offer which becomes dealable on at least one floor, the maker's workstation vocalizes the phrase "your offer". However, when a maker's price is dealable on at least one floor and then becomes dealable on another floor, no additional message is vocalized. Additionally, the workstation may vocalize the phrase "your bid, your offer" when a maker enters a bid and offer simultaneously and each is dealable on at least one floor. The workstation also reminds a maker that the bid or offer is dealable every ten seconds, for example, by vocalizing the appropriate phrase in correlation with a predetermined colored background (for example, red) in the screen's dealable window (FIG. 2B).

When an offer has been taken or a bid has been hit, simultaneous but different messages are vocalized to the maker and taker. On one side, when a taker completely takes a maker's offer to sell, the taker's workstation vocalizes the phrase "you buy <amount>"; and when a taker completely hits a maker's bid to buy, the taker's workstation vocalizes "you sell <amount>". On the other side, when a maker's offer to sell is completely taken, the maker's workstation vocalizes "<amount> mine"; and when a maker's bid to buy is completely accepted, the maker's workstation vocalize "<amount> yours". For example, when a taker sells to a maker, the taker's workstation vocalizes "you sell <amount>" while at the same time the maker's workstation vocalizes "<amount> yours".

A workstation's Trader Profile may be set so that a taker may work the balance when an order is only partially filled. The workstation user may set "work the balance" to 'always', 'partial', or 'never' as shown in FIG. 3A. If set to 'partial' the workstation will work the balance only if the order is partially filled, but not if it is missed completely. If set to 'partial' or 'always', the workstation allows a taker to become a maker. For example, when a taker accepts a partial offer for only half of an order, the taker then becomes a maker in search of the other half order until his/her order timer expires.

Additionally, messages telling the maker and taker when a hit or take has been completely or partially missed are vocalized. When a taker's hit or take completely misses, the taker's workstation vocalizes the phrase "missed it". When a maker's bid is partially hit, the maker's workstation vocalizes "<amount-filled> yours" followed by the phrase "working on" as other partial takes are received in an effort to fill the full amount. When a taker's order is partially filled, the taker's workstation vocalizes "you buy <amount-filled>" when a take and "you sell <amount-filled>" for a hit. After the order timer expires (if the balance is still being worked) or if there are no more bids or offers, the workstation vocalizes "missed <amount-missed>" for both hits and takes.

When a trader's bid or offer has been bettered the appropriate phrase "bid inside" or "offer inside" is vocalized by the trader's workstation. These phrases are related with a Trader Profile entry labelled "cancel when bettered" (as shown in FIG. 3A). This entry may be set either on or off. If "cancel when bettered" is set on and the trader's quote is no longer best anywhere, the workstation vocalizes the phrase "bid inside" followed by the phrase "bid canceled", and the bid is canceled. This vocalization coincides with the screen's price panel changing color (for example, to black). If "cancel when bettered" is set off and the trader's quote is no longer best anywhere the workstation only vocalizes the phrase "bid inside", but the bid is not canceled. This vocalization coincides with the screen's price panel changing color again (for example, to yellow).

There are three situations when the workstation will cancel a user's quote and vocalize the phrase "quote canceled": when a trader set quote timer expires, when a maker with an outstanding quote attempts a hit or a take, and when the "cancel when bettered" switch is on and the trader's quote is longer best anywhere.

The third category of messages a workstation may vocalize are system deals and price change reasons messages.

These messages provide all workstations dealing in the currency pair with the recent prices given and paid for that currency pair. These messages are shown in Table 7. There are three Trader Profile options that may be selected with regard to these messages. Referring to the Trader Profile shown in FIG. 3A, EBS deals and price change reasons may be set to 'Given/Paid for EBS Deals+Quote Out Messages' to provide information for all deals made over the EBS network. Or it may be set to 'Given/Paid as Price Change Reasons+Quote Out Messages' to provide information that is a price change reason in addition to providing information for all deals made over the EBS network. Or these messages may be set off by selecting 'No EBS Deals nor Price Change Messages said'. Also, if 'price' is not selected in the Trader Profile neither EBS deals nor price change reasons will be vocalized at the workstation.

If set to 'Given & Paid as EBS Deals' and 'price' is selected, the workstation vocalizes the phrases "<price> given" and "<price> paid" at all workstations dealing in the currency pair. In these messages the price consists solely of the pips unless the five minute figure timer has expired or a figure ambiguity condition exists. Conversely, if the five minute figure timer has expired or if the figure of the last announced price is not representative of the figure of the EBS Deal price, at least one digit of the figure is vocalized. Small deals are not vocalized, where small deals are those involving less than a predetermined number of units of the base currency (for example, five million U.S. dollars). However, a deal composed of multiple counterparties each associated with a different small deal may be vocalized. When there are multiple counterparties the taking size determines the vocalization. For example, if ten makers bid for one million units each at 1.7326 and one taker hits for a total of ten million units at 1.7326, the phrase "twenty-six given" is vocalized. However, if ten takers hit for one million units each from one maker bidding ten million units, no vocalization is made because the taking size is small, one million.

Similarly, in sell down and buy up situations only one price is vocalized, the worst price (from the taker's point of view). A sell down situation is when a taker chooses to sell portions of a total amount for multiple prices with some lower limit. In a sell down the worst price is the last and lowest price, and only it is vocalized. For example, if a taker sells forty million units in portions of ten million units each, accepting deals at 14, 12, 11, and 10; the workstation only vocalizes the phrase "ten given". A buy up situation is when a taker chooses to buy portions of a total amount for multiple prices with some upper limit. In a buy up, the worst price is the last and highest price, and only it is vocalized. For example, if a taker buys forty million units in portions of ten million units each, accepting deals at 10, 12, 13, and 14; the workstation only vocalizes the phrase "fourteen paid".

Additionally, systems deal messages are distributed over the EBS network on a clocked cycle. If more than one deal occurs during a cycle, only the last deal (which is typically the worst deal) is distributed and vocalized. If a buy, the worst deal is the highest price paid; and if a sell, the worst deal is the lowest price given.

If the Trader Profile is set to 'Given & Paid as Price Change Reasons' and 'price' is selected, the workstation vocalizes the phrases "<price> given" and "<price> paid" only when they are price change reasons. In this case, the phrase "<price> given" is vocalized when a bid is hit and there is a remaining lower bid and the phrase "<price> paid" is vocalized when an offer is taken and there is a remaining higher offer. Additional price change reason messages may also be vocalized. When a bid has been removed resulting in a decrease in the bid price, the workstation vocalizes the phrase "bid out". When an offer has been removed, resulting in an increase in the offer price, the phrase "offer out" is vocalized. And when both a bid and an offer have been removed resulting in a bid price decrease and an offer price increase, the workstation vocalizes the phrases "bid out", "offer out". These messages are vocalized regardless of deal size.

The three categories of messages all vie for vocalization at a workstation. Workstations vocalize messages in a prioritized order so that all private messages are vocalized before any public messages, where private messages are those messages that relay information about deals made at the workstation, and public messages are those messages that relay information about deals made at other workstations. Maker and taker specific messages are considered private, and market broadcast messages and system deals messages are considered public. Price change reason messages are maker and taker specific, and thus may be considered private messages, but may nevertheless have a lower priority than the other maker and taker specific messages.

In a currently preferred embodiment prioritization is implemented by two queues. An audio output buffer AOB contains the message that is currently being vocalized. A private events queue or PEQ contains maker and taker specific messages, and a market events queue or MEQ contains public messages. As soon as the message in the AOB has been vocalized, the workstation processes the message at the head of the PEQ (for example, by deleting it or moving it into the AOB) and continues doing so unless or until the private events queue is empty. When or if the PEQ is empty, the workstation similarly processes the public message at the head of the MEQ.

In the PEQ the workstation summarizes partial takes so that a single message "you bought <sum>" will be placed in the AOB when there are multiple partial takes. For example, if the PEQ contains five takes of amount 20, the workstation will summarize so that the message "you bought one hundred" is placed in the AOB rather than five "you bought twenty" messages. Newly received prices in either queue are processed so that only the newest is vocalized; the older price messages are deleted. Messages for completed deals are processed so that only the worst price is said: if an offer, the higher price is saved, and the lower price message is deleted from the queue; if a bid, the lower price is saved, and the higher price message is deleted from the queue.

TABLE 1 currency pairs, classes, and vocalizations

| <currency pair> | vocalization | class | symbol |
|---|---|---|---|
| US dollar/German mark | dollar mark | 1 | USD/DEM |
| US dollar/Swiss franc | dollar swiss | 1 | USD/CHF |
| ECU/US dollar | ecu dollar | 1 | XEU/USD |
| US Dollar/French franc | dollar paris | 1 | USD/FRF |
| Australian dollar/US dollar | auzzie dollar | 1 | AUD/USD |
| US dollar/Canadian dollar | dollar canada | 1 | USD/CAD |
| US dollar/Dutch guilder | dollar guilder | 1 | USD/NLG |
| German mark/Swiss franc | mark swiss | 1 | DEM/CHF |
| UK pound/US dollar | cable | 1 | GBP/USD |
| UK pound/German mark | sterling mark | 1 | GBP/DEM |
| Irish punt/US dollar | punt dollar | 1 | IEP/USD |
| US dollar/Singapore dollar | dollar singapore | 1 | USD/SGD |
| German mark/French franc | mark paris | 1 | DEM/FRF |
| US dollar/Belgian franc | dollar belge | 2 | USD/BEF |
| German mark/Japanese yen | mark yen | 2 | DEM/JPY |
| US dollar/Japanese yen | dollar yen | 2 | USD/JPY |

TABLE 2 class 1 price vocalizations

| price | format | vocalization |
|---|---|---|
| 1.2345 | F.FFPP | "one twenty-three forty-five" |
| 1.0345 | F.FFPP | "one oh three forty-five" |
| 1.2045 | F.FFPP | "one twenty forty-five" |
| 1.0045 | F.FFPP | "one double oh forty-five" |
| 1.2300 | F.FFPP | "one twenty-three figure" |
| 1.2305 | F.FFPP | "one twenty-three oh five" |
| 1.23456 | F.FFPPE | "one twenty-three forty-five and sixty" |
| 1.234567 | F.FFPPEE | "one twenty-three forty-five and sixty-seven" |
| 1.23455 | F.FFPPEE | "one twenty-three forty-five and a quarter" |
| 1.234525 | F.FFPPEE | "one twenty-three forty-five and a half" |
| 1.234575 | F.FFPPEE | "one twenty-three forty-five and three quarters" |
| 0.2345 | .FFPP | "twenty-three forty-five" |

TABLE 3 class 2 price vocalizations

| price | format | vocalization |
|---|---|---|
| 12.34 | FF.PP | "twelve thirty-four" |
| 12.345 | FF.PPE | "twelve thirty-four and a half" |
| 12.3456 | FF.PPEE | "twelve thirty-four and fifty-six" |
| 123.45 | FFF.PP | "one twenty-three forty-five" |
| 100.45 | FFF.PP | "one double oh forty-five" |
| 100.00 | FFF. | "one hundred" |
| 103.05 | FFF.PP | "one oh three oh five" |
| 123.00 | FFF.PP | "one twenty-three figure" |
| 123.4567 | FF.PPEE | "one twenty-three forty-five and sixty-seven" |

TABLE 4 sample price pair vocalization sequence

| bid | offer | delta | time since fig voiced | reason | form | vocalization |
|---|---|---|---|---|---|---|
| 1.7683 | 1.7695 | 12 | 0.00 | boot up | long | "one seventy-six eighty-three one seventy-six ninety-five" |
| 1.7690 | 1.7695 | 12 | 0.20 | <5 min | short | "ninety ninety-five" |
| 1.7705 | 1.7710 | 20 | 1.55 | <5 min | short | "oh five ten" |
| 1.7690 | 1.7695 | 20 | 2.32 | <5 min | short | "ninety ninety-five" |
| 1.7705 | 1.7710 | 20 | 3.05 | <5 min | short | "oh five ten" |
| 1.7695 | 1.7705 | 15 | 4.40 | <5 min | short | "ninety-five oh five" |
| 1.7692 | 1.7703 | 13 | 5.12 | >5 min | around | "ninety-two oh three around seven" |
| 1.7693 | 1.7698 | 11 | 0.40 | <5 min | short | "ninety-three ninety-eight" |
| 1.7695 | 1.7785 | 92 | 1.52 | delta > allowed | around | "ninety-five eighty-five around seven" |
| 1.7715 | 1.7765 | 90 | 0.37 | delta > allowed | medium | "one seventy-seven fifteen sixty-five" |
| 1.7725 | 1.7745 | 50 | 0.28 | delta > allowed | medium | "one-seventy-seven twenty-five forty-five" |
| 1.7720 | 1.7740 | 25 | 0.46 | <5 min | short | "twenty forty" |
| 1.7722 | 1.7737 | 20 | 2.34 | <5 min | short | "twenty-two thirty-seven" |
| 1.7726 | 1.7912 | 190 | 3.57 | delta > allowed | long | "one seventy-seven twenty-six one seventy-nine twelve" |
| 1.7905 | 1.7926 | 200 | 0.28 | delta > allowed | long | "one seventy-nine oh five one seventy-nine twenty-six" |
| 1.7896 | 1.7912 | 30 | 0.47 | <5 min | short | "ninety-six twelve" |

TABLE 5 market broadcast messages

| PHRASE | WHEN USED | HEARD BY | SYNTAX |
|---|---|---|---|
| small bid | small bid with regular offer | floor | <price><price> small bid |
| small offer | regular bid with small offer | floor | <price><price> small offer |
| in small | bid and offer small | floor | <price><price> in small |
| choice | bid and offer are identical | floor | <price> choice |
| choice small bid | identical small bid and regular offer | floor | <price> choice small bid |
| choice small offer | identical regular bid and small offer | floor | <price> choice small offer |
| choice in small | identical small bid and offer | floor | <price> choice in small |
| bid | regular size bid with no offer | floor | <price> bid |
| offered | regular size offer with no bid | floor | <price> offered |

TABLE 5-continued market broadcast messages

| PHRASE | WHEN USED | HEARD BY | SYNTAX |
|---|---|---|---|
| bid small | small bid only with no offer | floor | \<price\> bid small |
| offer small | small offer only with no bid | floor | \<price\> offered small |
| please | upon start up or after 5 minutes idle | floor | "\<currency-pair\> please" OR "quote please" |

TABLE 6 maker and taker specific messages

| PHRASE | WHEN USED | HEARD BY | SYNTAX |
|---|---|---|---|
| your bid | your bid is dealable somewhere | maker | your bid |
| your offer | your offer is dealable somewhere | maker | your offer |
| bid inside | bid is bettered | maker | bid inside |
| offer inside | offer is bettered | maker | offered inside |
| yours | bid is hit | maker | \<amount\> yours |
| mine | offer is taken | maker | \<amount\> mine |
| working on | partially dealt on quote is still alive | maker or taker | working on |
| canceled | EBS cancels a quote | maker | {bid \| offer} canceled |
| you sell | hit a bid | taker | you sell \<amount\> |
| you buy | take an offer | taker | you buy \<amount\> |
| missed it | missed a hit or take | taker | missed it |
| missed | partially miss a hit or take | taker | missed \<amount missed\> |

TABLE 7 system deals and price change reasons messages

| PHRASE | WHEN USED | HEARD BY | SYNTAX |
|---|---|---|---|
| given | regular bid hit | all floors | \<price\> given |
| paid | regular offer taken | all floors | \<price\> paid |
| bid out | bid removed | | "bid out" |
| offer out | offer removed | | "offer out" |

What is claimed is:

1. In an electronic trading system for executing transactions relating to a specified commodity and having a plurality of trader terminals for inputting price and quantity data from traders willing to buy and/or sell that commodity, an improved terminal for audibly announcing transactional data to an associated trader, the terminal comprising:

last price means for storing a last announced price;
price timeout means for determining when a first predetermined time has elapsed since the last announced price was verbalized;
current price means for receiving bid and offer components of a current price;
price change means responsive to the last price means and to the current price means for determining whether the current price is different from the last announced price;
price decomposing means for decomposing each component of the current price into at least one less significant digit associated with a pips portion and at least one more significant digit associated with a figure portion; and
pips announcing means responsive to the price change means, to the price timeout means and to the price decomposing means, for audibly announcing the pips portion of the current price if no price has been announced for the first predetermined period of time, or if the current price is not equal to the last announced price and no other transaction data is currently being announced;

wherein:
the pips announcing means announces the pips portion of the bid component of the current price separately from the pips portion of the offer component of the current price, with the pips portion of the bid component being vocalized with a rising pitch and the pips portion of the offer component being vocalized with a falling pitch.

2. The improved terminal of claim 1, wherein the pips announcing means announces only the pips portion if a figure enunciation condition does not currently exist.

3. The improved terminal of claim 1, wherein not all received prices include both a bid component and an offer component, and the pips announcing means announces the pips portions of both components only when the current price includes both a bid component and an offer component.

4. The improved terminal of claim 1, wherein:
each pips component is a multidigit number;
each possible value of each possible digit of each possible multidigit number is separately stored with both rising and falling intonations; and
the pips announcing means forms each vocalized pips component from at least two stored digits having the same respective intonation.

5. The improved terminal of claim of claim 1, wherein, if the bid and offer components of the current price are equal, the pips announcing means vocalizes only one of the components and the word "choice".

6. The improved terminal of claim 1, wherein, if only one of the components is present in the current price, the pips announcing means also announces whether the price is a "bid" price or an "offer" price.

7. The improved terminal of claim 1, further comprising
figure timeout means for determining when a second predetermined time has elapsed since a figure portion was last announced;
price spread means responsive to the current price means and to the last price means for determining whether a figure enunciation condition exists in which both figure portions of the current price are not readily apparent from the last announced price and the pips portion of the current price; and
figure announcing means responsive to the pips announcing means, to the figure timeout means and to the price spread means, for announcing at least one digit of the figure portion of the current price concurrently with the announcement of the pips portion whenever the second predetermined time has elapsed or the figure enunciation condition currently exists.

8. The improved terminal of claim 7, wherein the price spread means calculates a maximum spread between the minimum and maximum of the four values of the current bid price, current offer price, last announced bid price, and last announced offer price, and compares that maximum spread with a predetermined spread less than a one digit increment in the least significant digit of the figure portion.

9. The improved terminal of claim 8, wherein the predetermined spread assumes a first predetermined value when the current bid price is smaller than the current offer price and assumes a second predetermined value smaller than the first redetermined value when the current bid price is greater than the current offer price.

10. The improved terminal of claim 7, further comprising
figure spread means for determining a figure difference between the respective figure portions of the current bid price and the current offer price.

11. The improved terminal of claim 10, wherein:
said figure announcing means is further responsive to said figure spread means and vocalizes the figure portion in an abbreviated form when the figure difference is only one digit.

12. The improved terminal of claim 11, wherein:
said abbreviated form consists of "around" plus the least significant digit of the offer price.

13. The improved terminal of claim 10, wherein:
said figure announcing means is further responsive to said figure spread means and vocalizes at least one digit of the figure portion of both the bid price and the offer price when the figure difference is more than one digit.

14. The improved terminal of claim 13, wherein:
said figure announcing means vocalizes the bid and offer components of the current price in their entirety when the figure spread is more than one digit.

15. The improved terminal of claim 10, wherein:
said figure announcing means is further responsive to said figure spread means and vocalizes only one figure portion when the FIG. 4 difference is zero.

16. In an electronic trading system for executing transactions relating to a specified commodity and having a plurality of trader terminals for inputting price and quantity data from traders willing to buy and/or sell that commodity, an improved terminal for audibly announcing transactional data to an associated trader, the terminal comprising:
last price means for storing a last announced price;
price timeout means for determining when a first predetermined time has elapsed since the last announced price was verbalized;
current price means for receiving bid and offer components of a current price;
price change means responsive to the last price means and to the current price means for determining whether the current price is different from the last announced price;
price decomposing means for decomposing each component of the current price into at least one less significant digit associated with a pips portion and at least one more significant digit associated with a figure portion;
pips announcing means responsive to the price change means, to the price timeout means and to the price decomposing means, for audibly vocalizing the pips portion of the current price if no price has been announced for the first predetermined period of time, or if the current price is not equal to the last announced price and no other transaction data is currently being announced;

figure timeout means for determining when a second predetermined time has elapsed since a figure portion was last announced;
price spread means responsive to the current price means and to the last price means for determining whether a figure enunciation condition exists in which both figure portions of the current price are not readily apparent from the last announced price and the pips portion of the current price; and
figure announcing means responsive to the pips announcing means, to the figure timeout means and to the price spread means, for announcing at least one digit of the figure portion of the current price concurrently with the announcement of the pips portion whenever the second predetermined time has elapsed or the figure enunciation condition currently exists,
wherein only the pips portion of the current price is vocalized if a figure enunciation condition does not currently exist and the second predetermined time has not elapsed.

17. The improved terminal of claim 16, wherein not all received prices include both a bid component and an offer component, and the pips announcing means vocalizes the pips portions of both components only when both a bid component and an offer component have been received for current price.

18. The improved terminal of claim 16, wherein, if the bid and offer components of the current price are equal, the pips announcing means vocalizes only one of the components and the word "choice".

19. The improved terminal of claim 16, wherein, if only one of the components is present in the current price, the pips announcing means also vocalizes whether the price is a "bid" price or an "offer" price.

20. The improved terminal of claim 16, wherein the price spread means calculates a maximum spread between the minimum and maximum of the four values of the current bid price, current offer price, last announced bid price, and last announced offer price, and compares that maximum spread with a predetermined spread less than one figure digit.

21. The improved terminal of claim 20, wherein the predetermined spread is greater when the current bid price is smaller than the current offer price and is smaller when the current bid price is greater than the current offer price.

22. The improved terminal of claim 16, further comprising
figure spread means for determining a figure difference between the figure portion of the bid and offer components of the current price.

23. The improved terminal of claim 22, wherein:
said figure announcing means is further responsive to said figure spread means and vocalizes the figure portion in an abbreviated form when the figure difference is only one digit.

24. The improved terminal of claim 23, wherein:
said abbreviated form consists of "around" plus the least significant digit of the offer price.

25. The improved terminal of claim 22, wherein:
said figure announcing means is further responsive to said figure spread means and vocalizes at least one digit of the figure portion of both the bid price and the offer price when the figure difference is more than one digit.

26. The improved terminal of claim 25, wherein:
said figure announcing means vocalizes the bid and offer components of the current price in their entirety when the figure spread is more than a one digit increment in the least significant digit of the figure portion.

27. The improved terminal of claim 22, wherein:

said figure announcing means is further responsive to said figure spread means and vocalizes only one figure portion when the figure difference is zero.

28. In an electronic trading system for executing transactions relating to a specified commodity and having a plurality of trader terminals for inputting price and quantity data from traders willing to buy and/or sell that commodity, each of the prices including respective bid and offer components separated by a respective spread, an improved terminal for audibly announcing transactional data to an associated trader, the terminal comprising:

price decomposing means for decomposing the price components into at least one less significant digit associated with a pips portion and at least one more significant digit associated with a figure portion;

pips announcing means for announcing the pips portions of a current price;

figure ambiguity means responsive to the price decomposing means for determining whether a figure enunciation condition exists in which a maximum spread between the minimum and maximum of the four values of the current bid price, current offer price, last announced bid price, and last announced offer price, is greater than a predetermined allowable spread; and figure announcing means responsive to the figure ambiguity means for announcing at least one digit of the figure portion of the current price if the figure enunciation condition exists.

29. The improved terminal of claim 28, wherein the predetermined allowable spread is a first predetermined value when the current bid price is smaller than the current offer price and is a second predetermined value smaller than the first predetermined value when the current bid price is greater than the current offer price.

30. In an electronic trading system for executing transactions relating to a specified commodity and having a plurality of trader terminals for inputting price and quantity data from traders willing to buy and/or sell that commodity, at least some of the prices including respective bid and offer components separated by a respective spread, an improved workstation for audibly announcing transactional data to an associated trader, the workstation comprising;

a first message queue for private information specific to transactions initiated by a particular trader or trading floor, including whether a maker's bid or offer is dealable, bettered or acted on and whether a taker's response has been accepted or missed;

a second message queue for public information concerning other transactions in which the particular trader or trading floor is eligible to participate, including an indication of the best dealable price currently available that particular trader or trader floor, and if the current price is worse than a previously announced price, an indication as to whether the previously announced price was dealt on or was withdrawn;

an audio output buffer for containing a current message to be vocalized;

first priority means responsive to an empty condition of the output buffer for transferring information from the first message queue to the output buffer; and second priority means responsive to an empty condition of both the output buffer and the first message queue for transferring information from the second message queue to the output buffer.

31. The improved workstation of claim 30, wherein the first priority means summarizes multiple transactions of a same type.

32. The improved workstation of claim 31, wherein the summary of multiple transactions of a same type involving multiple prices is based on the worst price.

33. The improved workstation of claim 31, wherein the second priority means ignores an unannounced price that has been superseded.

* * * * *